United States Patent [19]
Ehrlich et al.

[11] Patent Number: 5,325,247
[45] Date of Patent: Jun. 28, 1994

[54] DIGITAL MULTI-RATE NOTCH FILTER FOR SAMPLED SERVO DIGITAL CONTROL SYSTEM

[75] Inventors: Richard M. Ehrlich, Campbell; David B. Jeppson, Livermore, both of Calif.

[73] Assignee: Quantum Corporation, Milpitas, Calif.

[21] Appl. No.: 974,931

[22] Filed: Nov. 12, 1992

[51] Int. Cl.$^5$ .............................................. G11B 5/596
[52] U.S. Cl. ................................ 360/78.09; 360/78.04; 318/611
[58] Field of Search ............... 360/78.09, 78.14, 78.04, 360/77.08; 318/611

[56] References Cited

U.S. PATENT DOCUMENTS

| | | | |
|---|---|---|---|
| 4,398,228 | 8/1983 | Bauck | 360/77.02 |
| 4,638,384 | 1/1987 | Stewart et al. | 360/77.05 |
| 4,679,103 | 7/1987 | Workman | 360/77.07 |
| 4,853,797 | 8/1989 | Yamada et al. | 360/32 |
| 4,963,806 | 10/1990 | Shinohara et al. | 318/621 |
| 4,964,009 | 10/1990 | Moriya et al. | 360/77.08 X |
| 5,032,776 | 7/1991 | Caragnon | 318/611 |
| 5,155,812 | 10/1992 | Ehlig et al. | 395/275 |

FOREIGN PATENT DOCUMENTS

WO91/10991 7/1991 PCT Int'l Appl.

OTHER PUBLICATIONS

McKnight, IEEE Transactions on Magnetics vol. Mag. 14 No. 4, 7/78, "A Track Locating Servo System Utilizing the Data as Absolute Position Transducers".

Wen-Wei Chiang, "Multirate State-Space Digital Controller For Sector Servo Systems" *IEEE Proc. 29th Conf. on Dec. and Control*, Dec. 1990 pp. 1902–1907.

*Primary Examiner*—Aristotelis Psitos
*Assistant Examiner*—James T. Wilson
*Attorney, Agent, or Firm*—David B. Harrison

[57] ABSTRACT

A digital servo control loop for a disk drive head position actuator implements a multi-rate notch filter in order to eliminate actuator resonances at frequencies above the sampling rate Nyquist frequency. The control loop includes circuitry responsive to the periodic digital position values sampled from embedded servo sectors which generates and puts out digital control values at the predetermined sampling rate for controlling the position of the actuator means. A digital multi-rate notch filter receives and filters the digital control values, and generates and puts out notch filtered digital control values to the actuator means at a rate comprising an integral multiple of the predetermined sampling rate.

4 Claims, 2 Drawing Sheets

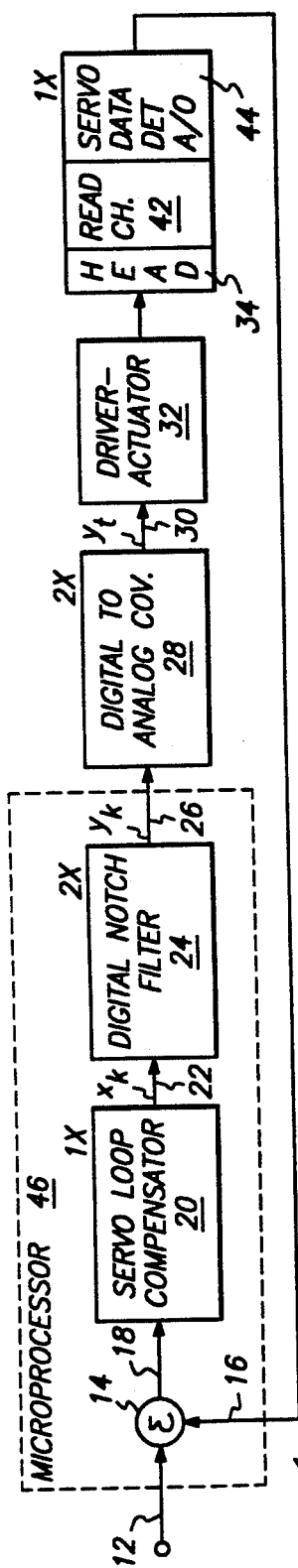
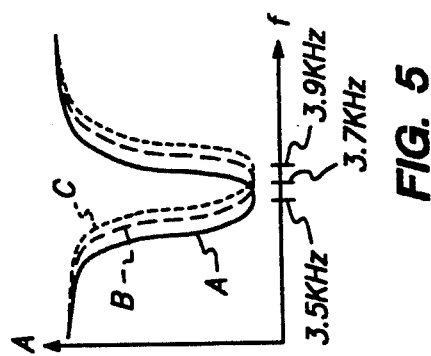
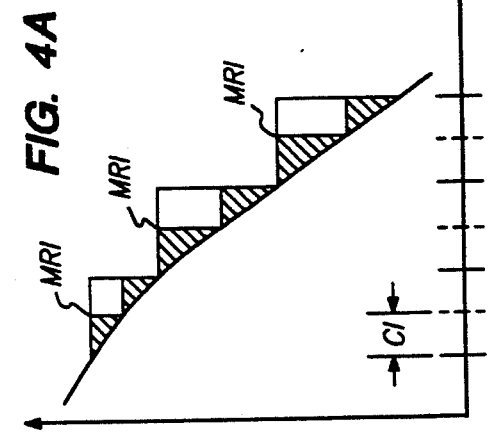
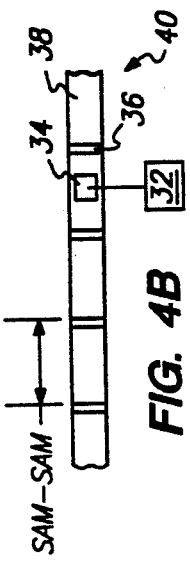
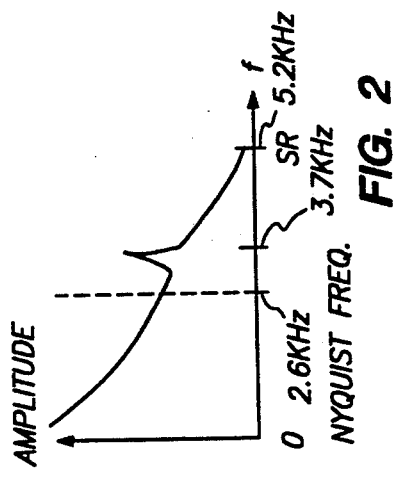
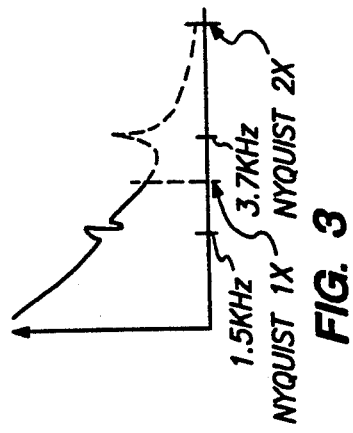

DIGITAL MULTI-RATE NOTCH FILTER FOR SAMPLED SERVO DIGITAL CONTROL SYSTEM

FIELD OF THE INVENTION

The present invention relates to digital servo control loops for control of an electromechanical system, such as disk drive data storage devices. More particularly, the present invention relates to a digital multi-rate notch filter for a digital sampling servo control system, e.g. for controlling head position within a disk drive.

BACKGROUND OF THE INVENTION

One known way to realize a low cost, yet high performance, disk drive is to provide a head positioner servo control loop which operates upon positional samples periodically read by the head from servo sectors embedded within concentric data tracks formed on an adjacent rotating data storage surface over which the head is presently passing. In this example, cost savings are realized by avoidance of a dedicated servo data surface, servo transducer and dedicated servo data detection channel in the disk drive.

During track seeking operations, position information is sampled from the sectors as the head moves from a departure track to a destination track. During track following operations, successive servo samples are taken from the servo sectors of a single data track being followed by the head under servo loop control. The sampled positional information is then compared by the digital servo control system with predicted positional location, and any deviation or error results in a correction current applied to a voice coil actuator and resultant corrective movement of the head-carrying actuator structure.

Increasingly, sampled servo head positioners are implemented with digital signal processing techniques. One known technique is to employ state estimation techniques for estimating parameters of the head positioning process. One example of this approach is provided in U.S. Pat. No. 4,679,103 to Workman entitled: "Digital Servo Control System for a Data Recording Disk File". The Workman patent discloses a digital servo control system implemented with a microprocessor. The system receives a digital head position error signal and a digital signal corresponding to the head actuator current. The system responds to these inputs by generating and putting out a digital control signal which is converted to analog and amplified before being applied to drive the actuator. The control signal is calculated from estimated values of absolute head position, head velocity and an equivalent actuator current required to compensate for constant or very low frequency actuator bias forces. The estimated head position, velocity and acceleration for each digital sample are functions of the predicted head position, velocity and acceleration, the measured head position, and the measured actuator coil current. These predicted values are updated with each sample and are derived from functions based upon a physical model of the voice coil actuator structure, taking into account its rotary inertia, friction, etc.

In the implementation of this digital approach, a considerable number of calculational steps must be carried out in a processing interval related to the servo sample interval. For example, the method described by the Workman '103 patent involves the following digital processing steps for each servo error signal sample:

1. generating from the servo information a sampled head position error signal representative of the position of the head relative to a centerline of the nearest track;
2. estimating the absolute head position relative to a reference, and estimating the head's radial velocity;
3. estimating the equivalent actuator input signal required to compensate for bias forces acting upon the actuator structure;
4. measuring the actuator input current;
5. computing a commanded head velocity as a function of the distance from the estimated absolute head position to the destination head position at a target track;
6. estimating the head radial acceleration as a function of the measured actuator current and the estimated bias force;
7. generating a control signal as a function of the head velocity error, the estimated head acceleration and the control signal generated for the prior servo error signal sample; and applying the control signal via a digital to analog converter to an actuator power amplifier which powers the actuator coil;
8. storing the estimated absolute head position, the estimated head velocity, the estimated bias force equivalent actuator input current, the measured actuator coil current, and the control sample;
9. predicting the absolute head position and the head velocity as functions of prior control signals, the prior estimated absolute head position, the prior estimated head velocity, the prior estimated bias force equivalent actuator input current, and constraints representative of a physical model of the actuator structure, the predicted absolute head position and velocity for each servo error signal sample being used during the step of estimating the absolute head position and head velocity for the subsequent error signal sample; and
10. predicting the bias force equivalent actuator input signal as a function of the prior estimated bias force actuator input current, the predicted bias force equivalent actuator input current for each servo error signal sample being used during the step of estimating the bias force equivalent actuator input current for the subsequent servo error signal sample.

This process also typically includes digital notch filtering steps for filtering out any resonances in the actuator structure in order to stabilize the servo control loop. As is suggested by this extensive list of required steps, a considerable amount of computation and related data manipulation is required to implement the Workman method. Further elaboration and practical design examples of digital control theory applicable to servo control of head positioning in disk files are found in Franklin, Powell and Workman, Digital Control of Dynamic Systems, 2d Ed., Addison-Wesley Publishing Company, New York, N.Y. ®1990, especially at pp 703–775: "Case Design: Disk-Drive Servo".

One performance improvement in the state estimator proposed in the Workman '103 patent (as it may be applied to embedded sector servo disk drives) is suggested in a paper by Wen-Wei Chiang, entitled: "Multirate State-Space digital controller for Sector Servo Systems", *IEEE Proc.* 29th Conf on Decision and Control. Honolulu, Hi. December 1990, pp. 1902–1907. This paper projects improvements in servo performance when the digital state estimator is made to operate at a rate which is an integer multiple (e.g. 2, 3, or 4 times) of the sector servo sample rate, so that the state feedback control of the actuator current may be computed and updated more frequently. One example of a practical disk drive design employing a multirate digital servo loop is provided in the present inventor's commonly assigned, copending U.S. patent application Ser. No. 07/954,557, filed on Sept. 30, 1992, and entitled: "Disk Drive Having On-Board Digital Sampling Analyzer"; the disclosure of this application is incorporated herein by reference.

From the foregoing, it is immediately apparent that the digital signal processor must inherently have sufficient processing power to carry out all of the process steps outlined above in multiple iterations within a single servo sampling interval. From a practical point of view, a multirate servo control process requires a high clock speed digital processor dedicated solely to making the computations and related data manipulations required to provide more frequent control signal updates. The significant signal processing capability required to realize a multirate servo loop may not be practical in lower cost disk drive designs which e.g. employ a single, multitasked digital microprocessor which divides its time between servo control functions and other functions such as supervision of data transfers and host-disk communications.

As suggested above, every servo actuator structure manifests a mechanical resonance at some frequency or frequencies. These vibrational modes, unless accounted for in the servo control design, can result in servo control loop instabilities. One known way to reduce the adverse effects of actuator resonance is to provide a notch filter in the servo control loop centered at the resonance frequency. A recent example of an analog notch filter providing some adjustability within a disk drive is found in U.S. Pat. No. 4,936,806.

It is known that in a discrete time domain (sampling) system, the system control transfer function manifests a minimum value at the sampling frequency. This characteristic has been proposed for use as a notch filter function in a head position servo control loop in order to filter out head actuator resonance, see, e.g., Bauck U.S. Pat. No. 4,398,228 entitled "Method of Avoiding Resonance in Servo Controlled Apparatus". One apparent drawback of this approach is that the sampling frequency must be chosen strictly in relation to the mechanical resonance of the actuator. Such a selection may not be optimum, given other design constraints. For example, when the actuator structure is varied, as by changing the number of disks/heads in the drive, a different sampling frequency and different overall servo control loop design would be required, even within the same product family design. Another inherent drawback is the inability of the Bauck servo loop to sense and respond to e.g. seek arrival transients occurring at the sample frequency and resulting in off-track data writing operations.

It is also understood that in order to avoid spectral aliasing in a discrete servo control system, it is necessary to apply filtering at a frequency not in excess of one half of the servo sample and control frequency. The half-frequency limit in the sampling control system is known as the Nyquist frequency. In a given actuator design, while the mechanical resonant frequency may lie above the Nyquist frequency, it will appear as an alias in the control spectrum below the Nyquist limit. When a conventional notch filter is applied at the lower alias frequency, the notch filter desensitizes the control system to any tracking errors otherwise lying in the notched-out frequency spectrum. In addition, a low notch frequency may lie dangerously close to the servo loop crossover frequency, and result in degradation of control loop phase margin. What has heretofore been needed has been a notch filter which effectively operates to null out a resonance or disturbance at a frequency above the Nyquist frequency limit of the servo signal sample rate.

SUMMARY OF THE INVENTION WITH OBJECTS

An object of the present invention is to provide a multirate digital notch filter in a digital sampling servo control system.

Another object of the present invention is to implement a multirate digital notch filter with control firmware executed by a control microprocessor in response to servo information obtained at a sample rate from a source, and wherein the digital notch filter control program is executed at a rate equal to an integral multiple of the sample rate, such as twice the sample rate.

Another object of the present invention is to increase the Nyquist limit frequency in a discrete digital sample servo control system implemented with a programmed digital controller by establishment of a multirate second order digital notch filter and output sequence.

A further object of the present invention is to provide multiple program control routines, including a macro control routine, and at least one micro control routine within a servo sampling interval implementing a multirate digital notch filter for notching out mechanical resonance of an actuator plant at a frequency higher than one half the servo sample rate.

One more object of the present invention is to provide a highly programmable multirate digital notch filter for use within a digital servo control system operating upon discrete servo samples in a manner enabling the sampling interval to be extended.

One further object of the present invention is to provide a multirate digital notch filter for a digital servo control system for controlling head position within a disk drive data storage device.

Yet another related object of the present invention is to implement a multirate digital notch filter within a digital servo control system for a disk drive which employs a single multitasked digital control processor otherwise lacking sufficient computational power to perform entire servo state estimation and output calculations and data manipulations at integral multiples of each servo control process interval.

In accordance with principles and aspects of the present invention, a method is provided for notch filtering a stream of discrete sequential digital control values put out by a digital sampling servo control system at a predetermined sampling rate wherein a notch filtering frequency lies above a Nyquist limit of the sampling rate by multirate notch filtering. This method includes for each of a sequence of sample intervals the steps of:

calculating a first notch filter output value as a function of a said discrete sequential control value and a predetermined notch filter function to provide a first notch filter output value, presently applying the first notch filter output value to a digital to analog conversion circuit of the servo control system, calculating a second notch filter output value as a function of the discrete sequential control value, the first notch filter output value and the said predetermined notch filter function to provide a second notch filter output value, temporarily storing the second notch filter output value, measuring a control interval at a rate comprising approximately an integral multiple of the sampling rate, and putting out the second notch filter output value at an end of the measured control interval.

One aspect of the present invention comprises the further steps of precomputing and storing a portion of the first notch filter output value during the sample interval, and during the step of calculating the first notch filter output value during the next sample interval the step of retrieving and using the precomputed portion of the first notch filter output value.

In another aspect of the present invention the step of measuring a control interval comprises the step of executing a digital macro service timing routine beginning in relation to the step of presently applying the first notch filter output value to the digital to analog conversion means and ending with the step of putting out the second notch filter output value.

In a further aspect of the present invention the predetermined notch filter function establishes a second order notch filter in accordance with the following discrete time domain (Z-plane) transfer function:

$$H_{(z)} = \frac{B_0 + B_1 \cdot Z^{-1} + B_2 \cdot Z^{-2}}{1 - A_1 \cdot Z^{-1} - A_2 \cdot Z^{-2}}.$$

In one more aspect of the present invention the steps of multirate notch filtering are carried out within a head position digital sampling servo control system of a disk drive including a rotating data storage disk prerecorded with embedded servo sectors within concentric data tracks, and a data storage transducer positioned by the head position digital sampling servo control system, and wherein the predetermined sampling intervals are established by the intervals between successive servo sectors read by the data storage transducer.

As a further facet of the present invention, a digital servo control loop for a disk drive head position actuator implements a multi-rate notch filter in order to eliminate actuator resonances at frequencies above the sampling rate Nyquist frequency. The control loop includes circuitry responsive to the periodic digital position values sampled from embedded servo sectors which generates and puts out digital control values at the predetermined sampling rate for controlling the position of the actuator means. A digital multi-rate notch filter receives and filters the digital control values, and generates and puts out notch filtered digital control values to the actuator means at a rate comprising an integral multiple of the predetermined sampling rate.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 1 is a functional block diagram of a digital sampling servo control system including a digital multirate notch filter in accordance with principles of the present invention.

FIG. 2 is a graph of a transfer function of an electromechanical actuator structure, such as a disk drive rotary actuator, in the continuous time domain.

FIG. 3 is a graph of a transfer function of the FIG. 2 electromechanical actuator structure shown in the discrete time domain.

FIG. 4A is a graph of an ideal continuous output control function upon which quantization control values for single rate (unshaded) and multirate (shaded) have been imposed.

FIG. 4B is a lineal depiction of a segment of a data storage track of a data storage disk along the same time base of FIG. 4A with a data transducer head superimposed over the track segment.

FIG. 5 is a family of graphs of notch characteristics for a frequency-adaptable digital multirate notch filter in accordance with principles and aspects of the present invention.

DETAILED DESCRIPTION OF A PREFERRED EMBODIMENT

Figure 6:
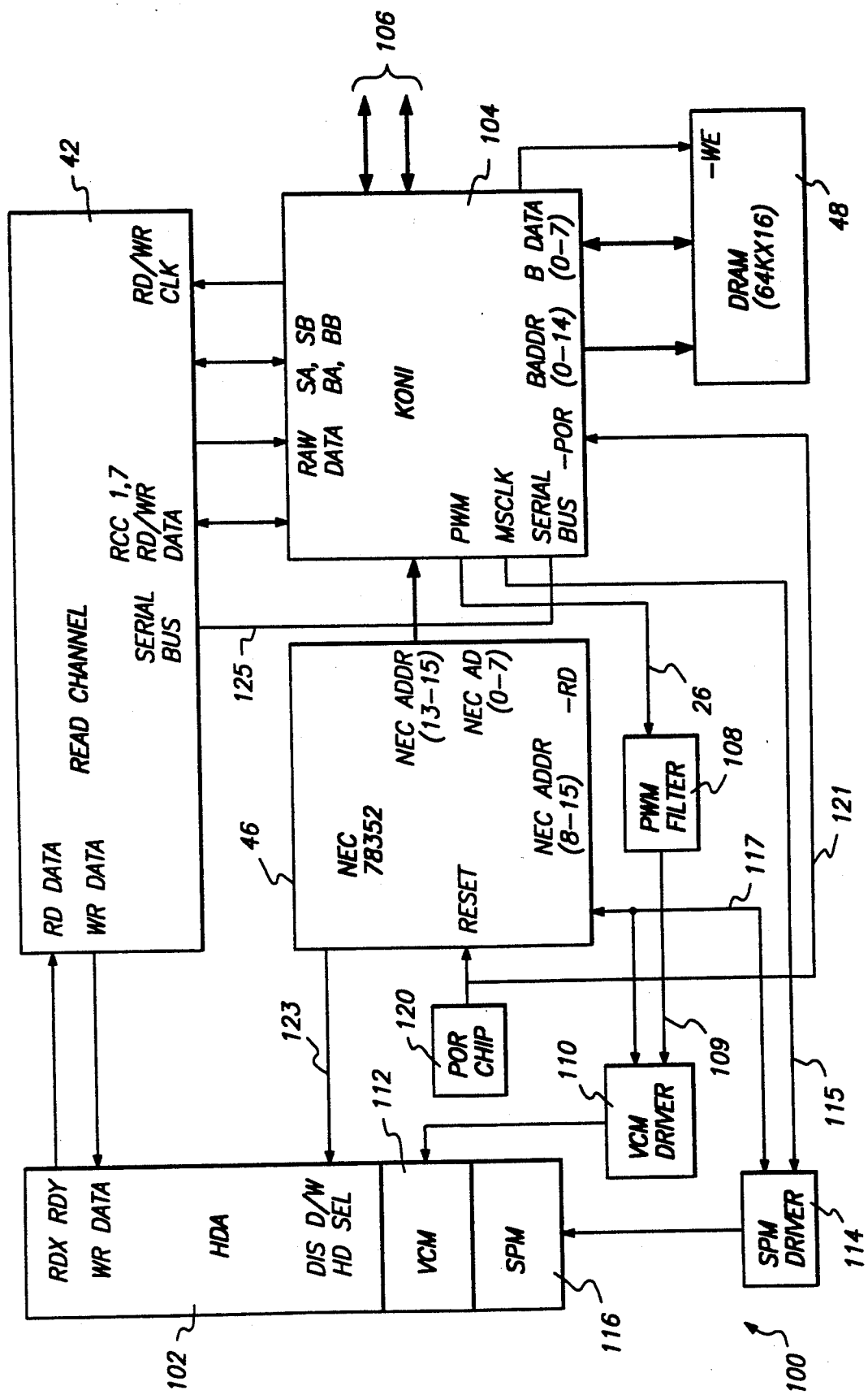
FIG. 6 is a structural block diagram of a disk drive including the FIG. 1 digital sampling servo control system.

An underlying premise of the present invention is to provide multiple outputs within a single servo sample interval in a discrete time servo control system. The constraints for a given sample rate may be due to the desire to limit or minimize the amount of head position information in the embedded servo sectors in order to maximize available data storage space. Multirate notch filtering also proceeds upon the assumption that the digital servo controller has some extra processing power sufficient to enable computation of servo outputs more frequently than once per each servo sample. With a dedicated servo digital signal processor and a sufficiently high clocking speed, it is practical to realize a multirate servo control system which performs the entire state estimation and output computation at a rate e.g. twice or three times faster than the basic servo sample rate for sampling the embedded head position information.

However, lower cost, miniaturized disk drives employing a single multitasked digital control processor simply lack sufficient processing power to perform the entire state estimation and output calculation, and also to complete the other assigned computational or control tasks within each available processing time period. This invention provides a practical way to task the multitasked digital control processor with a multirate notch filter function without degrading unduly microprocessor performance of other assigned tasks.

An overview of a digital control servo loop 10 including multirate notch filtering in accordance with principles of the present invention is depicted in the FIG. 1 block diagram. A digital position command value is applied at an input 12 to a summing junction 14. A digital positional sample value $y_n$ on a path 16 is fed back to the summing junction 14 and is differenced with the command value. The servo position sample value $y_n$ is taken at a sampling rate (1X) which in the presently described example has an interval of about 191 microseconds. The interval between successive servo sectors (FIG. 4B) is established by servo address marks (SAMs), and is generally referred to herein as the "SAM to SAM" interval. The detection of each SAM results in generation of a servo service routine interrupt of a multitasked microcontroller 46. The SAMs occur at a frequency of about 5235 kilohertz. The resulting difference on a path 18 is processed by a digital servo loop compensator 20 generally similar to the one described in the Workman '103 patent noted above. An unfiltered output $x_k$ is put out from the servo loop compensator at the 1× rate on a path 22 to a digital notch filter 24 which operates at a 2× clock rate (multirate) in accordance with principles of the present invention. Notch filtered output values $y_k$ on a path 26 from the digital notch filter 24 are then converted to continuous analog values $y_t$ at the 2× clock rate by a digital to analog converter 28. These values are then applied over a path 30 to an driver amplifier and voice coil actuator 32. The period of each 2× output value is hereinafter referred to as a "control interval" or "CI" and it is generally one half the SAM to SAM interval.

In this example, the driver-actuator 32 is a rotary voice coil actuator structure 112 of a miniature disk drive 100 (FIG. 6) including a bidirectional analog power driver 110. The block 32 denotes a physical model thereof in terms of rotary inertia, bias forces and mechanical/electrical offsets, etc. The driver-actuator 32 responds to the input driving signal $x_t$ by a movement. This movement is sensed by the servo system 10 when, for example, a data transducer head 34 positioned by the actuator passes over and reads positional information from as it passes over a servo sector 36 of a data track 38 recorded on the surface of a rotating data storage disk 40 as shown in FIG. 4B. The positional signal is processed by a read channel 42 and converted into a digital word by a servo signal recovery process 44 typically including an analog to digital converter and put out as the positional sample $y_n$ over the feedback path 16, as previously explained.

The summing junction 14, servo loop compensator 20 and digital notch filter 24 are enclosed by a broken line box which denotes that these processes are implemented by the single, multitasked microcontroller 46. In this example, the microcontroller is preferably NEC type 78352, or equivalent. FIG. 5 illustrates one advantage of implementing the multirate notch filter in firmware executed by the microprocessor 46. Graph A of FIG. 5 shows the notch centered at e.g. 3.5 KHz. Graph B shows it centered at 3.7 KHz; and graph C shows the notch centered at 3.9 KHz. These different center frequencies may be readily realized merely by changing certain parameters in the algorithm establishing the multirate digital notch filter. FIG. 5 thus shows that the notch may be made very sharp and narrow, and its center frequency may be tuned digitally to be optimized to notch out the particular resonance characteristics of the disk drive actuator structure 32, thereby substantially extending drive tolerances in large scale manufacturing. A method for automatically "tuning" the notch filter is discussed below.

FIG. 2 illustrates in the continuous time domain a typical transfer function of the actuator plant 32 in which a descending mass line indicates a mechanical resonance at e.g. 3.7 kHz. In this example, with a sampling rate of 5.235 KHz, the Nyquist frequency or limit is 2.617 KHz, which is below the vibration. FIG. 3 illustrates the discrete time transfer function of the same actuator plant 32. With a conventional sampling-filtering-compensation control system, the mass line is shown in solid line in FIG. 3, and effectively stops at the Nyquist limit frequency. There is no sensed response by a conventional digital servo control loop at a frequency above the Nyquist limit frequency as established by the error signal sampling rate.

Continuing with the FIG. 2 example, the 3.7 KHz resonance may become folded into the spectrum below the Nyquist limit frequency as some disturbance which must be taken into account. As a rough rule of thumb, if the height of the peak of the disturbance in the continuous transfer function (FIG. 2) approaches the height of the mass line of the discrete transfer function (FIG. 3) at the alias location, the disturbance will affect servo loop stability and must be filtered. In this example, with a resonance at 3.7 KHz, the alias will be located at approximately 1.5 KHz (5.2 KHz sample rate minus 3.7 KHz resonance). If a conventional notch filter is implemented for 1.5 KHz, it will render the control loop insensitive at this frequency, and it may adversely affect phase margin of the servo loop by being too close to the open loop cross-over frequency, which in the present example is approximately 400 Hz. If an analog notch filter is added in the path 30 leading to the actuator plant 32, the filter components of the filter will be "outboard" of the servo processor and will require printed circuit board space and installation (undesired in miniature disk drives).

In accordance with aspects of the present invention, a discrete time second order notch filter has a complex gain H which varies with complex frequency z in accordance with the following expression:

$$\frac{Y(z)}{X(z)} = H(z) = \frac{B_0 + B_1 z^{-1} + B_2 z^{-2}}{1 - A_1 z^{-1} - A_2 z^{-2}} \quad (1)$$

wherein $B_0$, $B_1$, $B_2$, $A_1$ and $A_2$ are coefficients which determine frequency domain notch filter characteristics. This expression may be expressed as a real time (single rate) notch filter function in accordance with the following expression:

$$Y(k) = A_1 Y(k-1) + A_2 Y(k-2) + B_0 X(k) + B_1 X(k-1) + B_2 X(k-2) \quad (2)$$

As implemented within the hardware described herein by the microcode of the program listing at the end of this specification, two calculations of equation (2) are carried out within a single control interval, one calculation for Y1(k) which is presently applied to the DAC 28, and another calculation for Y2(k) which is stored and then applied to the DAC 28 at a later time within the same servo sampling interval in order to achieve multi-rate notch filtering. This dual calculation is preferably made in accordance with the two following expressions:

$$Y1(k) = A_1 Y2(k-1) + A_2 Y1(k-1) + B_0 X(k) + (B_1 + B_2) X(k-1) \quad (3)$$

and $$Y2(k) = A_1 Y1(k) + A_2 Y2(k-1) + (B_0 + B_1) X(k) + B_2 X(k-1) \quad (4).$$

Actually, all but the one current term ($B_0 X(k)$) of the Y1(k) equation (3) is calculated in the immediately prior control interval and saved as a variable NOTCH_SUM for the present control interval as a precalculation (program listing label "MACW 2") and is summed with the current sample included in the term $B_0 X(k)$. The Y2(k)

equation (4) is calculated in the present control interval (program listing label "MACW 3") and is presently saved as NOTCH_MS_BUFFER for later output by a macro service routine to the DAC 28 during the sampling interval T, such as at T/2. The five coefficients $B_0$, $B_1$, $B_2$, $A_1$ and $A_2$ are e.g. 16 bit values which are preferably determined at the factory as part of the manufacturing or final test procedure and are stored with other values in the notch filter routine.

The multirate notch filter 24 is most preferably implemented as a control subroutine which is executed in real time by the microcontroller 46. The overall servo control system 10 implements separate control structures for seeking, settling and track following operations, as explained in greater detail, for example, in commonly assigned U.S. patent application Ser. No. 07/762,683 filed on Sep. 19, 1991 and entitled "Head Position Servo Architecture for High Capacity, High Performance Disk Drive Having Embedded Controller and Bus-Level Interface", the disclosure of which being hereby incorporated by reference. The notch filter subroutine may thus be called from several locations in the overall servo control program sequence in order to reduce the amount of control code necessary for all of the servo functions and modes. An exemplary subroutine in NEC 78352 assembly language is set forth at the end of this specification and it comprises approximately 200 bytes of executable code.

The digital notch filter function 24 requires two discrete operations. One of the operations actually computes the two outputs. An output xk is obtained from the servo loop compensator 20. This output is processed by the notch filter function 24, and two outputs are put out from that function: one present output that immediately gets passed to the digital to analog converter function 28, and another that is delayed by a predetermined delay period set up by a macro service routine of the microcontroller 46. The macro service routine measures a delay of e.g. 96 microseconds. At the end of the delay period ("MRI" in FIG. 4A), the other output is sent out to the DAC 28 for conversion into an analog control value.

In the present example the sample interval is approximately 191 microseconds. The notch filter subroutine set forth hereinafter, including the step of setting up for a second, delayed output (multirate filter output), requires about 23 microseconds for execution. Execution is enhanced by appropriate use of random access memory space on board the microprocessor 46, known as short address space or "SADDR". Approximately 18 bytes of the 256 available SADDR bytes are required for the notch filter subroutine. The executable code for the notch filter subroutine is part of the servo code which is most preferably stored in on-board read only memory (ROM) of the microcontroller 46 so as to minimize access times for time critical processes. Less time critical firmware executed by the controller 46 may be loaded into a DRAM 48 from system tracks of the disk drive, after the head positioner servo is operational following a power-on reset sequence.

With multirate digital notch filtering, the notch filter 24 may be set to any frequency up to 5.2 KHz, and the filter will easily be able to notch out the resonance at 3.7 KHz, at the location thereof diagrammed in FIGS. 2 and 3. This notch filter frequency is well above the open loop cross-over frequency, and does not degrade phase margin or gain of the digital control system. The 3.7 KHz notch may be made considerably deeper and narrower, and it will eliminate any aliasing otherwise resulting from the Nyquist limit associated with the servo sector sampling rate. In addition, as shown in FIG. 4A, the granularity of the output control is effectively cut in half, and thereby more closely follows a command trajectory, etc. The finer granularity of the control achieved by the 2× (multirate) output to the DAC 28 suggests that less low pass filtering is required of the input current to the actuator structure 32, resulting in less phase lag and performance degradation in the overall control loop.

FIG. 6 sets forth an electrical block diagram of a miniature disk drive 100 which embodies the digital servo control system 10 including multirate notch filtering in accordance with the present invention. In the FIG. 6 diagram, elements which correspond to previously described elements are referred to by the same reference numerals. The disk drive 100 includes a head and disk assembly including one or more rotating data storage disks 40. The disks 40 have any suitable diameter, such as 3.5 inches, 2.5 inches, 1.8 inches, 1.3 inches, etc. In miniature disk drives printed circuit board space is at a premium, and there is room only for a few integrated circuits, as shown in FIG. 6.

One of the integrated circuits is a VLSI ASIC 104 which combines a SERDES, a 1,7 RLL ENDEC, a data sequencer, the servo detector 44, a buffer memory controller for generating addresses for the DRAM 48, and a high level interface control state machine and buffer as a single circuit. This circuit 104 includes user data and control buses 106 extending to a host computing system, not shown.

The DRAM memory 48 is addressed by the circuit 104. The memory 48 includes control program routines executed by the microcontroller 46, and further provides temporary storage for blocks of user data passing to and from the storage disks 40 and the host computing system. A pulse width modulator circuit 108 receives the digital control values yk on the path 26 and converts those values to analog and low pass filters the resultant analog control. The analog actuator control is then applied over a path 109 to a voice coil motor driver circuit 110 which converts the analog control into an input driving current for driving the coil of a voice coil motor 116 of the actuator plant structure 32.

A spindle motor driver 114 provides three phase driving currents to a DC brushless spindle motor 116. The data storage disks 40 are directly mounted to a rotating hub of the spindle motor 116. Examples of a presently preferred head and disk assembly 102 are to be found in copending, commonly assigned U.S. patent applications Ser. No. 07/839,870 filed on Feb. 21, 1992; and Ser. No. 07/870,681 filed on Apr. 17, 1992; the disclosures thereof being hereby incorporated by reference. The HDA 102 includes a read preamplifier/head select-write driver integrated circuit (not shown) which operates under the control of the microcontroller 46 by virtue of a control path 123.

Frequency trim of the spindle motor driver 114 is controlled by a control line 115 extending from the circuit 104. A control line 117 extending from the microcontroller 46 to the VCM driver circuit 110 and to the spindle motor driver circuit 114 provides for power down/power up control of the voice coil motor 112 and the spindle motor 116. A power-on reset circuit 120 generates and puts out a reset signal on a path 121 to the microcontroller 46 and to the circuit 104 when power is first applied to the disk drive 100. A serial data bus 125 extends between the circuit 104 and the read channel circuit 42 and enables control values to be passed to the read channel 42 to control e.g. a frequency synthesizer function therein as well as the passband of a digital band pass filter.

The servo data detector function 44 within the circuit 104 functions substantially in accordance with the teachings of commonly assigned U.S. patent applications Ser. No. 07/569,065 filed on Aug. 17, 1990, now U.S. Pat. No. 5,170,299; and Ser. No. 07/710,172 filed on Jun. 4, 1991, the disclosures thereof being hereby incorporated herein by reference.

Returning to FIG. 5, it is seen that the notch filter frequency may be adjusted between e.g graph A at 3.5 KHz; graph B at 3.7 KHz and graph C at 3.9 KHz. These adjustments may be readily made, either at the factory during drive final burn-in and check out, or they may be selected dynamically, as part of an initialization routine when the disk drive is first powered up. In this regard, it is presently preferred to provide a table of available filter characteristics and to select and use the five filter parameters of formula (1) above for each filter A, B or C, for example.

To provide dynamic filter adaptation for the track seek servo structure, the disk drive 100 successively performs seeks of known distance and direction, with each of the notch filters A, B and C. Access time is then measured for each seek, and the notch filter resulting in the lowest access time characteristic is then selected and used during subsequent disk drive track seeking operations. Separate filter structures may be implemented, depending upon actuator plant differences in response to radially outward and radially inward seeking directions.

In order to provide dynamic filter adaptation for the track following servo structure, track following of a selected test data track 38 is carried out with each of the filter structures A, B and C, and dither about the track centerline is monitored and saved. The filter structure 24 resulting in the lowest dither about the centerline is then selected and used during subsequent disk drive track following operations. In this regard, the variance in the average of the sum of the squares of the tracking error is used as the preferred filter performance measurement.

Here follows a listing in assembly language of a control program subroutine for implementing one presently preferred example of a multirate digital notch filter in accordance with the present invention.

```
; Code to implement a multirate digital NOTCH-filter for drive 100. The effects of
; the filter can be expressed by the following three equations:

x(k) = 32 * COMPENSATOR_OUTPUT(k)

y(k) = (A1_NORM * y(k-1)) + (A2_NORM * y(k-2)) +
           (B0_NORM * x(k))  + (B1_NORM * x(k-1)) + (B2_NORM * x(k-2))

DAC_OUTPUT(k) = (1/32) * y(k)

; where COMPENSATOR_OUTPUT(k) refers to whatever output would have been
; sent out to the DAC were it not for this NOTCH-filter, and DAC_OUTPUT(k)
; refers to the output that is actually sent out to the DAC.

; The indices (k, k-1, k-2, etc) refer to CI's (Control-Intervals),
; not SAM's. Since the multirate filter operates at twice the SAM-rate,
; k is incremented twice for each SAM. The value of COMPENSATOR_OUTPUT(k)
; changes only every other k. Thus, if k = 2*K,

COMPENSATOR_OUTPUT(2K+1) = COMPENSATOR_OUTPUT(2K)

; The overall transfer-function of the NOTCH-filter is:

-1        -2
                 B0_NORM + B1_NORM*z + B2_NORM*z
        N(z) = ---------------------------------
                              -1        -2
                 1     - A1_NORM*z - A2_NORM*z

; Memory is assumed to be arranged as follows:

; NOTCH_B0          1 WORD      ; B0 = B0_NORM * 4000H
; NOTCH_B1          1 WORD      ; B1 = B1_NORM * 4000H
; NOTCH_B2          1 WORD      ; B2 = B2_NORM * 4000H
; NOTCH_A1          1 WORD      ; A1 = A1_NORM * 4000H
; NOTCH_A2          1 WORD      ; A2 = A2_NORM * 4000H
; NOTCH_XKM2        1 WORD      ; XKM2 stands for "x(k-2)". Units are (1<<5) times PWM_VALUE.
; NOTCH_YKM1        1 WORD      ; YKM1 stands for "y(k-1)". Units are (1<<5) times PWM_VALUE.
; NOTCH_YKM2        1 WORD      ; YKM2 stands for "y(k-2)". Units are (1<<5) times PWM_VALUE.
; NOTCH_SUM         1 WORD      ; Pre-computed part of NOTCH-filter output. Units are (1<<2) times PWM_VALUE.
; MACRO_BUF_PTR     1 WORD      ; Will Point to pwm high byte at koni2. Now 1 byte is aeqbm, 1 is ms buffer.
; NOTCH_MS_COUNTER  1 BYTE      ; Macro service counter. Set to 2 to avoid interrupt actually happening.
; NOTCH_MS_SFRP     1 BYTE      ; Points to P1. at KONI2 will point to 78352 pwm1.

; Even though XKM2 is scaled up from the originally-inputted value,
; COMPENSATOR_OUTPUT, by 5 bits, its resolution is no finer than that of
; COMPENSATOR_OUTPUT (The scaling change is accomplished via a
; shift-left instruction, performed on COMPENSATOR_OUTPUT). NOTCH_YKM1 and NOTCH_YKM2
; are also scaled up from DAC_OUTPUT by 5 bits. They do have a finer
; resolution than DAC_OUTPUT, by 3 bits (The additional 2 bits are just to
; allow a wider range of values for A1_NORM and A2_NORM, and are obtained
; via a shift-left instruction, performed on the computed output-value).
```

```
; This finer resolution allows the notch to behave in a linear fashion
; for relatively small variations in COMPENSATOR_OUTPUT, even when the
; (normalized) NOTCH-filter coefficients are near to unity-magnitude.

; If you need to split up the memory-block, the only important orderings
; are (NOTCH_B2, NOTCH_A1, NOTCH_A2) and (NOTCH_XKM2, NOTCH_YKM1, NOTCH_YKM2) (ie, each of those two groups
; of three words MUST be a contiguous group of 6 bytes. All other sets
; of variables can be "scattered" throughout $ADDR-space).

; From the scaling of NOTCH_A1, NOTCH_A2, NOTCH_B0, NOTCH_B1, and NOTCH_B2, it is apparent that each
; of the corresponding normalized coefficients is constrained to have a
; magnitude of less than 2.0. Thus,

;       |A1_NORM| < 2.0

;       |A2_NORM| < 2.0

;       |B0_NORM| < 2.0

;       |B1_NORM| < 2.0

;       |B1_NORM| < 2.0

;       |B2_NORM| < 2.0

; In addition, the B's must meet two more constraints:

;       |B0_NORM+B1_NORM| < 2.0

;       |B1_NORM+B2_NORM| < 2.0

; Thus, the sums, (B0_NORM+B1_NORM) and (B1_NORM+B2_NORM), must also be
; constrained to be smaller in magnitude than 2.0. This constraint is
; not usually a severe one, since B0_NORM, B1_NORM, and B2_NORM are
; typically of alternating sign.

; Finally, the sum of all the positive values in the set, (A1_NORM, A2_NORM,
; B0_NORM, B1_NORM, B2_NORM) must be less than 4.0, and the sum of all the
; negative values in that same set must be smaller in magnitude than 4.0.
; This should not be a problem, as long as all of the poles and zeroes of
; the notch are contained within the unit circle.

; If all of the above conditions are satisfied, the code below needs to
; do very little overflow-checking and saturation of computation results.
; As it it written now, the code could "blow it" in a bizzare fashion
; if the above conditions are violated.

; The following pointers are defined below, using EQUATE's:

; PTR1 = &XKM2:&B2
; PTR2 = &YKM1:&A1

;;PTR1       EQU    #(256*(#LOW NOTCH_XKM2))+(#LOW NOTCH_B2)
;;PTR2       EQU    #(256*(#LOW NOTCH_YKM1))+(#LOW NOTCH_A2)

; Code to take care of out-of-range outputs. The main subroutine,
; NOTCH_FILTER, branches to these code-blocks if any of the computed
; outputs are outside the limits of the 10-bit DAC.

PROBLEM1:     BT     A.7, $SAT_NEG1
SAT_POS1:     MOVW   AX, #(8*3FFH)
              BR     $AFTER_PROBLEM1
SAT_NEG1:     MOVW   AX, #0
              BR     $AFTER_PROBLEM1

PROBLEM2:     BT     A.7, $SAT_NEG2
SAT_POS2:     MOVW   AX, #(8*3FFH)
              BR     $AFTER_PROBLEM2
SAT_NEG2:     MOVW   AX, #0
              BR     $AFTER_PROBLEM2

;****************************************************************************
;****             START OF SUBROUTINE, NOTCH_FILTER ****
;****************************************************************************

PUBLIC NOTCH_FILTER

NOTCH_FILTER:

; At this point, it is assumed that the AX register contains an
; output value that would have been sent directly out to the DAC
; if it were not for the NOTCH-filter, below. Thus, the value in
; AX is constrained, 0000H <= AX <= 03FFH.
```

```
; This value (in AX now) will be up-shifted by 5 bits, and then
; referred to as XK, or the K'th input to the NOTCH-filter.
;---------------------------------------------------------------------------------

MOVW    PWM_VALUE,AX        ; Save for records output.

SHLW    AX, 5               ; UP-shift by 5 bits, to increase available range of B-coefficients
            MOVW    UP, AX              ; Save XK value into UP for later use.
            MOVW    SERVO_BC, NOTCH_B0  ; Get coefficient, NOTCH_B0, into BC-register.
            MULW    BC                  ; AXBC contains (XK * NOTCH_B0)

ADDW    AX, NOTCH_SUM       ; Add in pre-computed portion of output

CMPW    AX,#(8*3FFH)        ; Compare (up-shifted) output to (upshifted) output-limit
            BH      $PROBLEM1           ; If it's outside the limits, then go fix it
AFTER_PROBLEM1:

;---------------------------------------------------------------------------------
; At this point, AX contains the value,
;
;       XK*NOTCH_B0 + NOTCH_SUM
;
; This value must be rounded and then down-shifted by 3 bits before
; being outputted to the DAC. However, it will also be up-shifted by
; 2 bits and stored into NOTCH_YKM1 (NOTCH_YKM1 stands for y(k-1)).
;---------------------------------------------------------------------------------

MOVW    DE, AX              ; Save AX for later UP-shift and storage to NOTCH_YKM1
            ADDW    AX,#4               ; Rounding, in preparation for DOWN-shift and output to DAC
            SHRW    AX, 3               ; DOWN-shift AX by 3 bits FIRST_OUTPUT:
            MOV     R8, A               ; Save Upper 2 bits of DAC-value into R8 (We're gonna use A, now)
            MOV     A, P1               ; Get present value of P1 into A-register
            OR      A, #04H             ; Set Bit#2 of A (corresponds to latch-bit in P1)
            MOV     P1, A               ; Write it out to P1 (actually sets the latch-bit)
            AND     A, #0FCH            ; Mask-off bottom 2 bits of A-register
            OR      A, SERVO_R8         ; OR-in top two bits of DAC-value into bottom two bits of A-register
            MOV     P0, SERVO_X         ; Move bottom 8 bits of DAC-value out to P0
            MOV     P1, A               ; Write DAC-bits (latch-bit set) and rest of P1-bits out to P1
            AND     A, #0FBH            ; Clear Bit#2 in A-register (corresponds to latch-bit in P1)
            MOV     P1, A               ; Write it out to P1

;---------------------------------------------------------------------------------
; Setup macro service timing and reset control parameters for macro service.
;---------------------------------------------------------------------------------

MOVW    AX,TM1              ; Get current value of timer 1.
            ADDW    AX,#HALF_CYCLE_TIME ; Add 1/2 sample rate in clk cycles.
            MOVW    CM10,AX             ; Load 2nd output time to compare register.
            MOV     NOTCH_MS_COUNTER,#2 ; Set macro service counter to 2.
;;;         CLR1    CMIC10.MK_BIT          ; enable Notch output servo interrupt.
                                        ; Eventually, this will be done only at seek setup.
;;;         SET1    CMIC10.ISM_BIT         ; enable Notch output servo interrupt macro service.
                                        ; Eventually, hopefully, this wont have to happen here.
                                        ; because msc never gets to 0, so ms stays enabled.

;---------------------------------------------------------------------------------
; The rest of the code is "out-of-line" code.
;---------------------------------------------------------------------------------

MOVW    NOTCH_YKM2, NOTCH_YKM1 ; Store the 2nd output of the previous sam into notch_ykm2.
            SHLW    DE, 2               ; UP-shift DE, before storing into NOTCH_YKM1
            MOVW    NOTCH_YKM1, SERVO_DE ; Store (UP-shifted version of) latest output ;---------------------------------------------------------------------------------
; Figure out the next NOTCH-output, which will be sent out to the
; DAC via the macro-service facility of the microcontroller.
;---------------------------------------------------------------------------------

MOVW    AX, UP              ; AX now contains XK, the latest compensator output
            MOVW    SERVO_DE, NOTCH_B0  ; Put NOTCH_B0 into DE
            ADDW    SERVO_DE, NOTCH_B1  ; DE now contains (NOTCH_B0 + NOTCH_B1)
            MULW    DE                  ; AXDE contains (XK * (NOTCH_B0+NOTCH_B1))

MOV     C,#LOW NOTCH_B2
            MOV     B,#LOW NOTCH_XKM2

MACW    3                   ; AXDE = XK*(NOTCH_B0+NOTCH_B1) +
                                        ;        NOTCH_XKM2*NOTCH_B2   +
                                        ;        NOTCH_YKM1*NOTCH_A1   +
                                        ;        NOTCH_YKM2*NOTCH_A2

CMPW    AX,#(8*3FFH)        ; Compare (up-shifted) output to (upshifted) output-limit
            BH      $PROBLEM2           ; If it's outside the limits, then go fix it
AFTER_PROBLEM2:

MOVW    DE, AX              ; Save AX for later UP-shift and storage to NOTCH_YKM1
            ADDW    AX,#4               ; Rounding, in preparation for DOWN-shift and output to DAC
            SHRW    AX, 3               ; DOWN-shift AX by 3 bits
```

```
;----------------------------------------------------------------
; We're not really going to do an output, now. Just set things up so that
; the MACRO-service facility can do it for us.
;----------------------------------------------------------------

SECOND_OUTPUT:
            MOV     R8, A                  ; Save Upper 2 bits of DAC-value into R8 (We're gonna use A, now)
            MOV     A, P1                  ; Get present value of P1 into A-register
            OR      A, #04H                ; Set Bit#2 of A (corresponds to latch-bit in P1)
            MOV     P1, A                  ; Write it out to P1 (actually sets the latch-bit)
            AND     A, #0FCH               ; Mask-off bottom 2 bits of A-register
            OR      A, SERVO_R8            ; OR-in top two bits of DAC-value into bottom two bits of A-register;
            MOV     P0, SERVO_X            ; Move bottom 8 bits of DAC-value out to P0
            MOV     P1, A                  ; Write DAC-bits (latch-bit set) and rest of P1-bits out to P1
            AND     A, #0FBH               ; Clear Bit#2 in A-register (corresponds to latch-bit in P1)
            MOV     NOTCH_NS_BUFFER, A     ; Save A into NOTCH_NS_BUFFER, for later output (via MACRO-service)

;----------------------------------------------------------------
; Now, do as much pre-compute as is possible for the next SAM's outputs.
;----------------------------------------------------------------

MOVW    NOTCH_YKM2, NOTCH_YKM1
            SHLW    DE, 2                  ; UP-shift DE, before storing into NOTCH_YKM1
            MOVW    NOTCH_YKM1, SERVO_DE   ; Store (UP-shifted version of) latest output
            MOVW    NOTCH_XKM2, SERVO_UP MOVW    AX, UP                 ; AX = NOTCH_XKM2 [Next SAM, this will be x(k-2)]
            MOVW    SERVO_DE, NOTCH_B1     ; DE = NOTCH_B1
            ADDW    SERVO_DE, NOTCH_B2     ; DE = (NOTCH_B1+NOTCH_B2)
            MULW    DE                     ; AXDE = (NOTCH_XKM2*(NOTCH_B1+NOTCH_B2))

MOV     C,#LOW NOTCH_A1
            MOV     B,#LOW NOTCH_YKM1
                                           ; Set B->NOTCH_YKM1, C->NOTCH_A1

MACW    2                      ; AXDE = NOTCH_XKM2*(NOTCH_B1+NOTCH_B2) +
                                           ;        NOTCH_YKM1*NOTCH_A1           +
                                           ;        NOTCH_YKM2*NOTCH_A2

MOVW    NOTCH_SUM, AX          ; Store pre-computed part of output into NOTCH_SUM RET                            ; We're outa here!

END
```

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for multi-rate notch filtering of a stream of discrete sequential digital control values generated by a digital sampling servo control system of a disk drive including a rotating data storage disk prerecorded with a series of circumferentially spaced apart embedded servo sectors of head positioning information within concentric data tracks, a voice coil actuator means for positioning a data storage transducer at selected ones of the data tracks, an actuator position sensing means including the data storage transducer, for sensing position of the actuator means from each servo sector at a predetermined servo sector sampling rate, and a single multi-tasked disk drive programmed digital microcontroller, generating the stream of discrete sequential digital control values at the predetermined servo sector sampling rate in response to the sensed periodic digital position values and a desired actuator position value for controlling the position of the actuator means wherein a desired notch filtering frequency lies above a Nyquist limit of the servo sector sampling rate by multi-rate notch filtering including, for each one of a sequence of servo sector sample and calculation intervals between adjacent servo sector samples, the steps of:

digitally calculating with the programmed digital microcontroller means a first notch filter output value as a function of a said discrete sequential control value and a predetermined notch filter function to provide a first notch filter output value, applying the first notch filter output value to a digital to analog conversion means of the servo control system during a first control interval within the present servo sector sample and calculation interval for controlling the position of the actuator means, digitally calculating with the programmed digital microcontroller means a second notch filter output value differing from the first notch filter output value and as a function of the discrete sequential control value, the first notch filter output value and the said predetermined notch filter function to provide a second notch filter output value, temporarily storing the second notch filter output value in a memory means, digitally marking in time a second control interval immediately following the first control interval at a rate comprising approximately an integral multiple of the servo sector sampling rate, and putting out the second notch filter output value from the memory means to the digital to analog conversion means during the second control interval before the next servo sector sample occurs for controlling the position of the actuator means.

2. The method set forth in claim 1 comprising the further steps of precomputing and storing a portion of the first notch filter output value within the memory means during a present servo sector sample interval, and during the step of calculating the first notch filter output value during a next servo sector sample interval the step of retrieving from the memory means and using the precomputed portion of the first notch filter output value to calculate with the programmed digital microcontroller means the second notch filter output value.

3. The method set forth in claim 1 wherein the step of digitally marking in time a second control interval comprises the step of executing a digital macro service timing routine beginning in time relation to the step of presently applying the first notch filter output value to the digital to analog conversion means and ending with the step of putting out the second notch filter output value to the digital to analog conversion means.

4. The method set forth in claim 1 wherein the predetermined notch filter function establishes a discrete time second order notch filter having a complex gain H which varies with complex frequency z according to the function:

$$H_{(z)} = \frac{B_0 + B_1 \cdot Z^{-1} + B_2 \cdot Z^{-2}}{1 - A_1 \cdot Z^{-1} - A_2 \cdot Z^{-2}}$$

wherein $B_0$, $B_1$, $B_2$, $A_1$ and $A_2$ are coefficients which determine frequency domain notch filter characteristics.

* * * * *